March 17, 1942.  W. H. LINDAE  2,276,786
DISCONNECTING SWITCH
Filed April 15, 1940  6 Sheets-Sheet 1
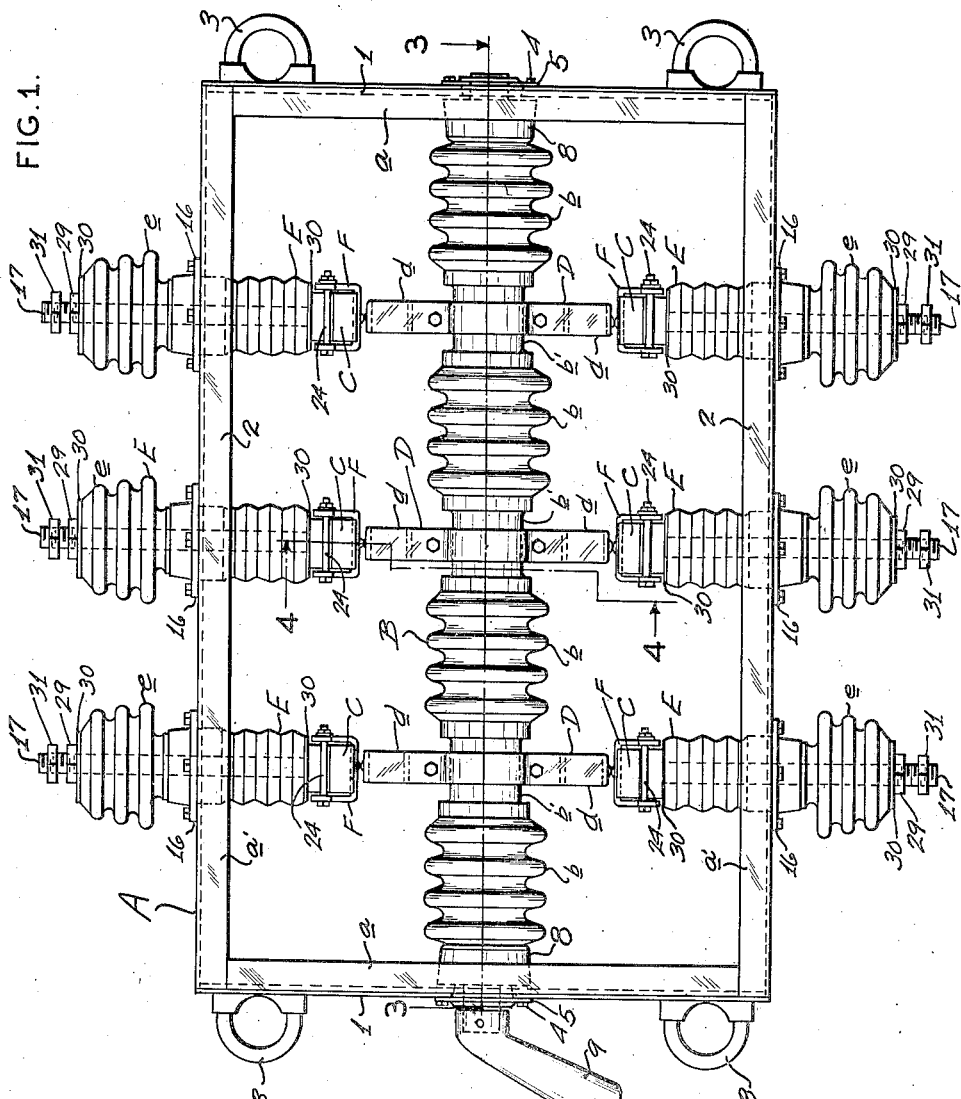
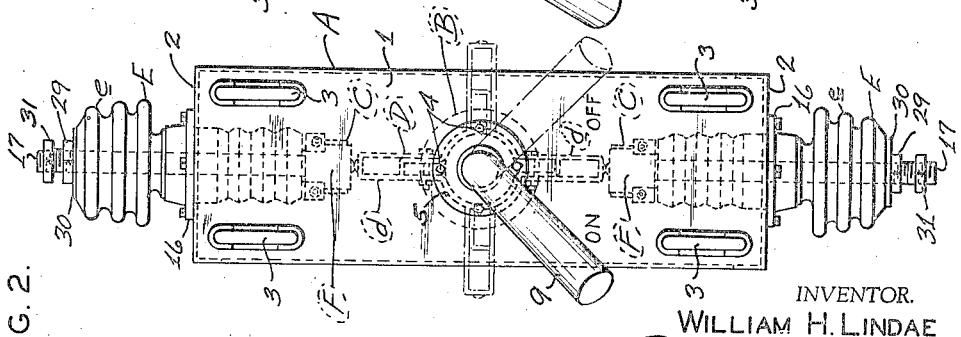
INVENTOR.
WILLIAM H. LINDAE
BY
ATTORNEY.

March 17, 1942.   W. H. LINDAE   2,276,786
DISCONNECTING SWITCH
Filed April 15, 1940   6 Sheets-Sheet 2
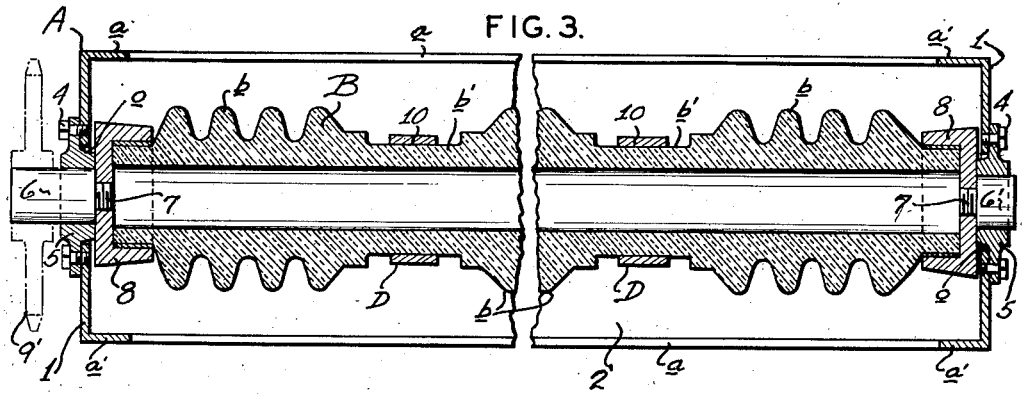
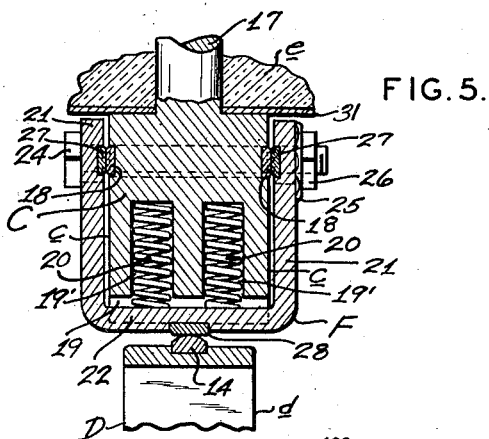
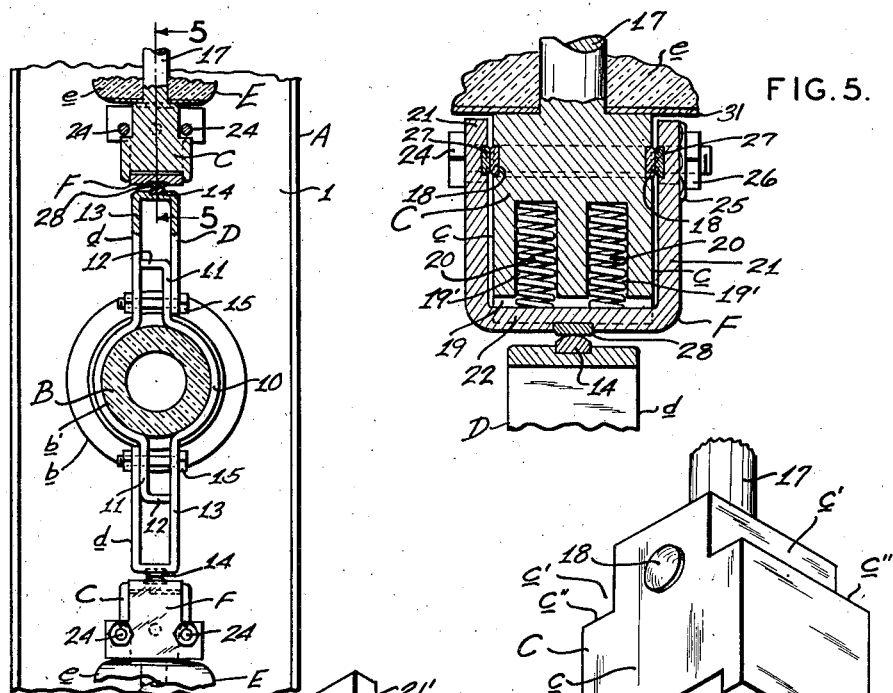
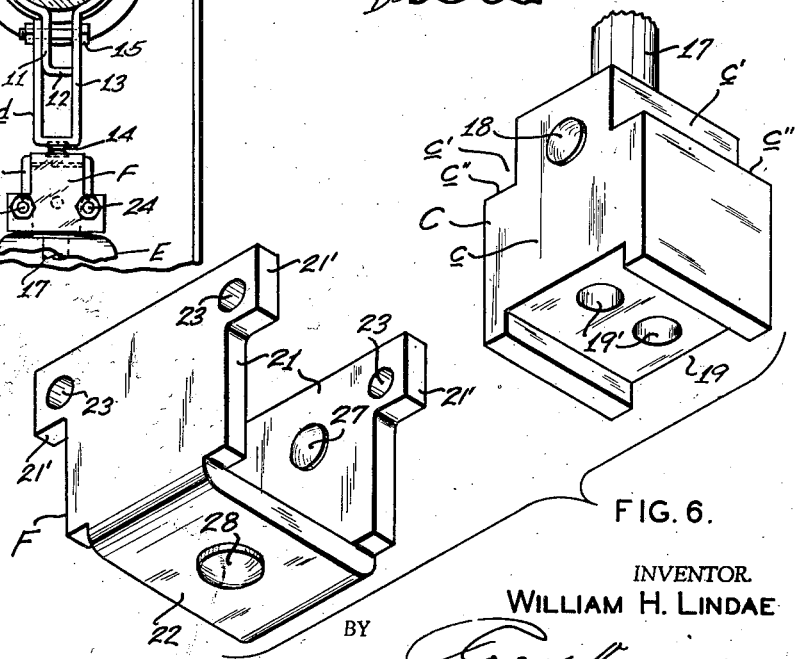
INVENTOR.
WILLIAM H. LINDAE
BY
ATTORNEY.

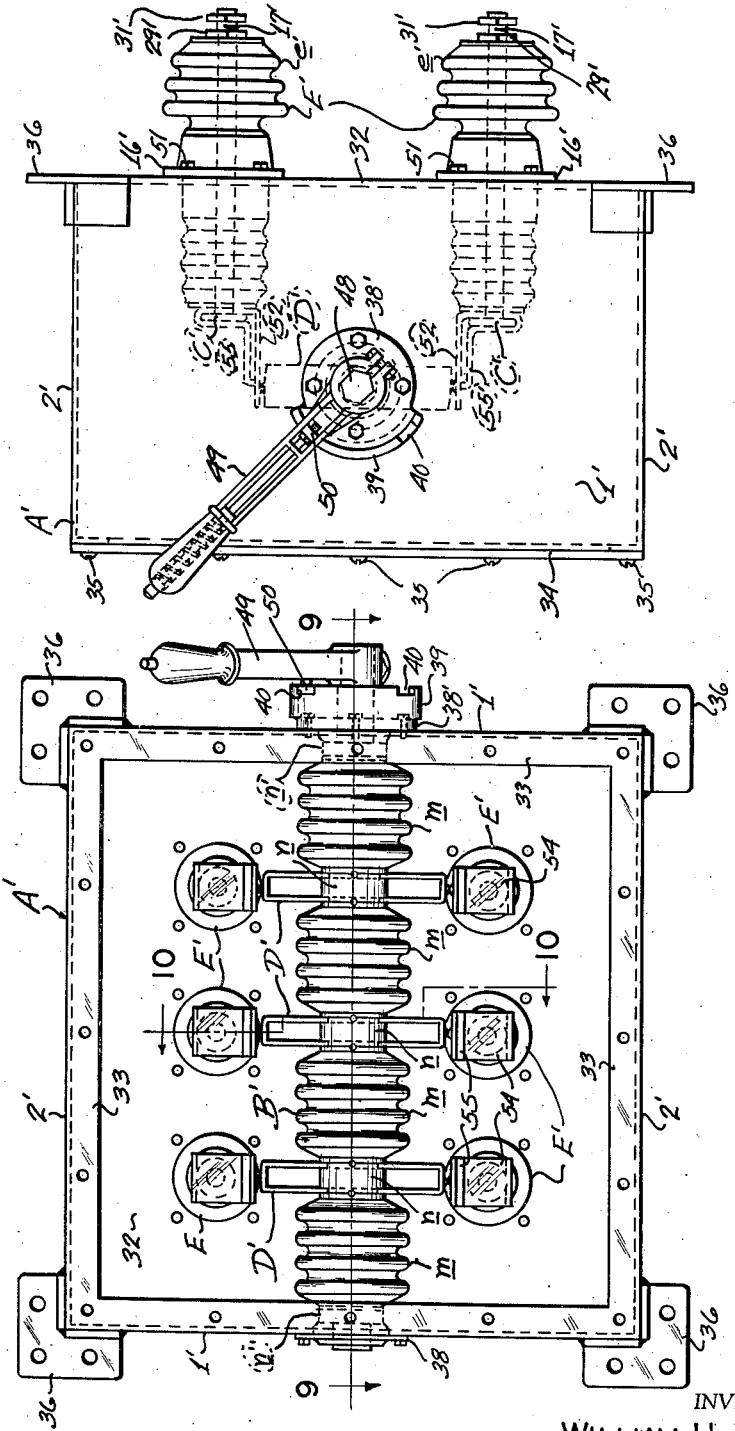

March 17, 1942.    W. H. LINDAE    2,276,786
DISCONNECTING SWITCH
Filed April 15, 1940    6 Sheets-Sheet 4

INVENTOR.
WILLIAM H. LINDAE
BY
ATTORNEY.

March 17, 1942.	W. H. LINDAE	2,276,786
DISCONNECTING SWITCH
Filed April 15, 1940	6 Sheets-Sheet 5

INVENTOR.
WILLIAM H. LINDAE
BY
ATTORNEY.

March 17, 1942.   W. H. LINDAE   2,276,786
DISCONNECTING SWITCH
Filed April 15, 1940   6 Sheets—Sheet 6

INVENTOR.
WILLIAM H. LINDAE
BY
ATTORNEY.

Patented Mar. 17, 1942

2,276,786

UNITED STATES PATENT OFFICE 2,276,786

DISCONNECTING SWITCH

William H. Lindae, St. Louis, Mo., assignor of one-half to Joseph P. Pohrer, St. Louis County, Mo.

Application April 15, 1940, Serial No. 329,774

12 Claims. (Cl. 200—8)

This invention relates generally to electric switches and, more particularly, to a certain new and useful improvement in disconnecting switches of the so-called rotary or oscillatory type adapted especially, though not exclusively, for high tension installations.

My invention has for its primary object the provision of an electric switch of the type mentioned which is safe and positive in operation, which is extremely resistant to high voltage break-down and current leakage, which is capable of making and breaking contact with a minimum of arcing, which has an exceedingly low contact resistance, and which is highly efficient in the performance of its intended functions.

My invention also has for a further object the provision of a switch of the type stated which may be readily manufactured, which is built up of component parts so facilely co-operable that a wide variety of different switch sizes and capacity may be economically constructed from a single stock of basic parts, and which is rugged and durable, easily operable, and conveniently installed.

My invention also has for another object the provision in a switch of the type mentioned of contact-means uniquely constructed of co-operable parts or elements for materially reducing contact resistance and for substantially diminishing the arc created upon circuit make and break thereof.

And with the above and other objects in view, my invention resides in the novel features of form, construction, arrangement, and combination of parts presently described and pointed out in the claims.

In the accompanying drawings (6 sheets)—

Figure 1 is a front elevational view of an electric disconnecting switch constructed in accordance with and embodying my invention;

Figure 2 is an end elevational view of the switch;

Figure 3 is a slightly enlarged broken longitudinal sectional view of the switch, taken approximately along the line 3—3, Figure 1;

Figure 4 is a transverse sectional view of the switch, taken approximately along the line 4—4, Figure 1;

Figure 5 is an enlarged sectional view of the switch, taken approximately along the line 5—5, Figure 4;

Figure 6 is a detail perspective view illustrating the component parts of a fixed contact-member of the switch;

Figure 7 is a front elevational view of a modified disconnecting switch embodying my present invention;

Figure 8 is an end elevational view of the modified switch of Figure 7;

Figure 9:
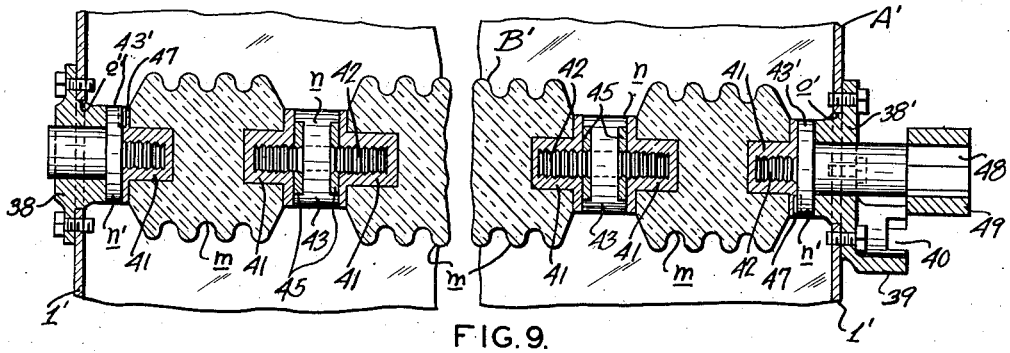
Figures 10, 11:
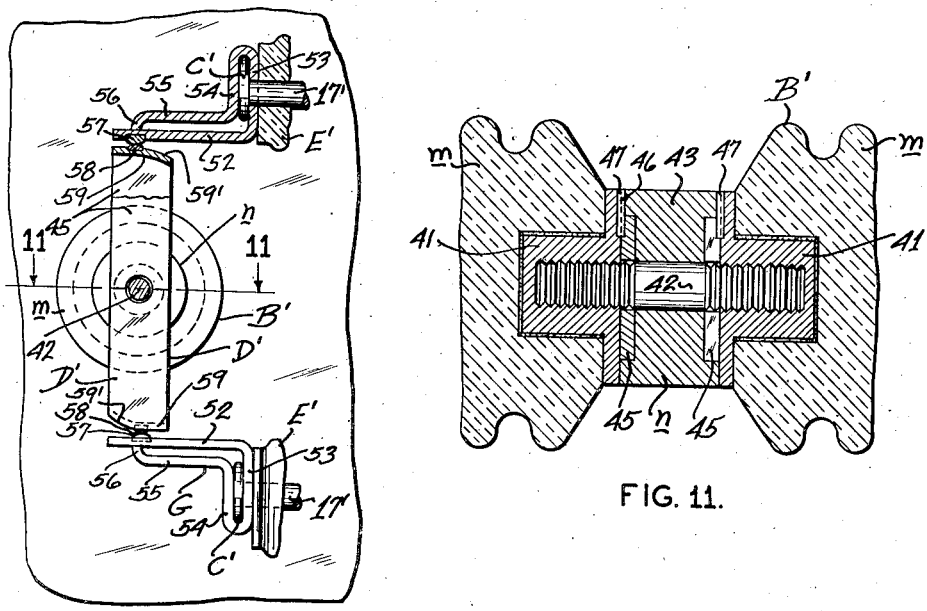
Figure 12:
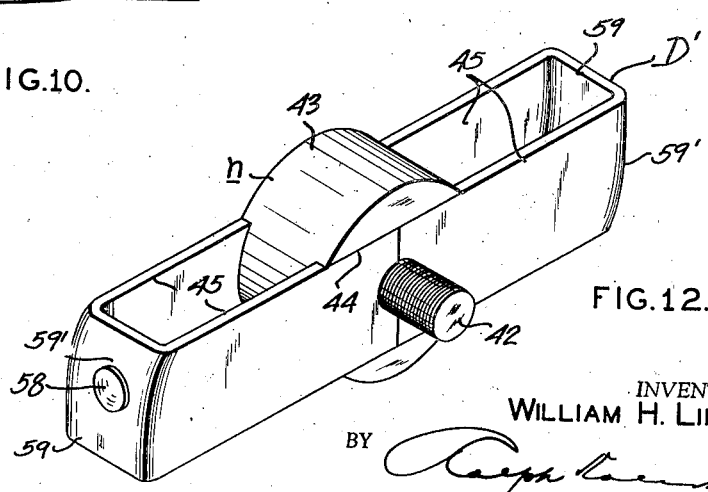
Figure 19:
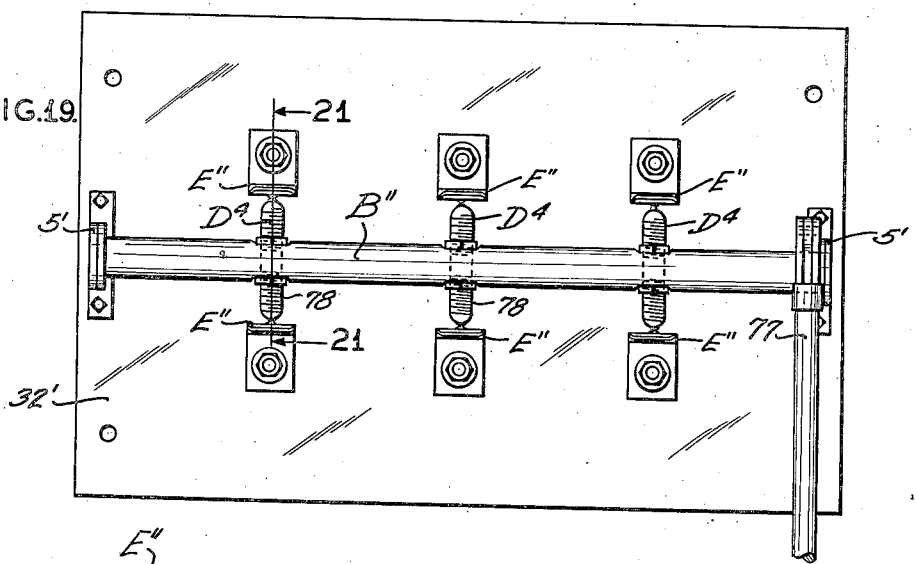
Figure 21:
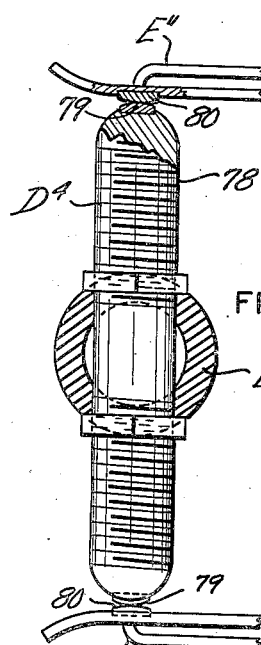
Figure 20:
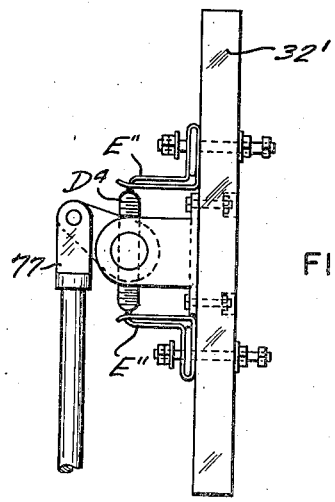
Figure 22:
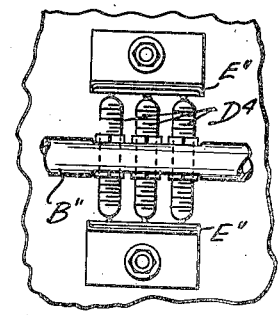

Figures 9 and 10 are longitudinal and transverse sectional views of the modified switch, taken, respectively, approximately along the lines 9—9 and 10—10, Figure 7;

Figure 11 is an enlarged detail sectional view of a switch blade mounting assembly, taken approximately along the line 11—11, Figure 10;

Figure 12 is an enlarged perspective view of a switch blade mounting assembly of the modified switch of Figure 7;

Figures 13 to 18, both inclusive, are fragmentary views of modified switch blades and co-operable contact-posts or terminals embodied in my present invention;

Figure 19 is an elevational view of a somewhat modified electric disconnecting switch embodying my invention;

Figure 20 is an end view of the switch of Figure 19;

Figure 21 is an enlarged detail sectional view, taken approximately on the line 21—21, Figure 19; and Figure 22 is a fragmental elevational view illustrating an enlargement of the carrying capacity of this switch-type by increasing the number of blades for terminal engagement.

Referring now in more detail and by reference characters to the drawings, which illustrate practical embodiments of my invention, the switch includes a housing or casing A comprising a pair of spaced parallel end plates or walls 1 and so-called top and bottom or side plates or walls 2 welded or otherwise suitably secured permanently together in rectilinear open-side shell or frame formation, said plates or walls 1, 2, being preferably provided with inwardly turned marginal flanges, as at $a$, $a'$, overlapped and welded together for frame re-enforcement.

The end plates 1 are also provided with centrally disposed registering apertures, as at $o$, and on their outwardly presented faces with upper and lower pairs of transversely aligned mounting clamps 3 of any suitable or conventional design.

Fixed and secured, as by bolts 4, upon the end walls 1 and partially fitting the apertures $o$, as best seen in Figure 3, are bearing-members 5, in turn, suitably apertured for accommodating respective journal-studs 6, 6', each provided with a reduced endwise presented threaded extension 7 for supporting connection with a respective suitable preferably metallic end-cap 8 cemented or otherwise permanently and rigidly fixed upon the ends of an insulation shaft B formed preferably of glazed porcelain and preferably integrally including a plurality of diametrally enlarged corrugated sections b intermediately spaced by blade mounting-hubs b' each preferably having a suitably roughened periphery.

The journal-stud 6 is preferably elongated for mounting a conventional actuating lever or handle 9, as shown in Figures 1 and 2, or a gear 9', as shown in dotted lines in Figure 3, all for purposes presently fully appearing.

Clampwise secured upon each of the hub-sections b' of the shaft B, as best seen in Figure 4, is a switch-blade D. Such blade, as shown, comprises two oppositely disposed like or companion components or members d each constructed of a suitably elongated preferably conducting strap bent or otherwise formed to integrally include an annular hub-engaging section 10 intermediate its ends, a connection-arm 11 reenforcingly flanged at right angles at its free or outer end, as at 12, and an oppositely disposed substantially U-shaped arm 13 sized for snug-fitting embracing disposition over the flanged arm 11 of the companion blade-member d and provided in the outer face of its bight with an outwardly presented preferably hemi-spherical contact-plug 14, the blade arms 13 and associated connection-arms 11 being provided with suitable registering apertures for accommodating suitable securing bolts or the like 15 for tightly and rigidly clamping the blade-members d together and upon the particular hub b', as best seen in Figure 4 and for purposes presently fully appearing. In this regard, it should be noted that the component members d of the switch-blade D are so interlocked and clamped together by the members 15 that the oppositely disposed switch-arms 13 are constantly maintained in true diametral alignment with respect to each other and the continuity of electrical contact therebetween maintained at all operating times, as will be presently more fully set forth.

Securely mounted in and extending transversely through the shell or frame walls or plates 2, is a plurality of suitably spaced pairs of axially aligned and juxtaposed terminal posts E, the posts E of each pair being disposed diametrically upon opposite sides of the shaft B and each including a tubular insulator e of glazed porcelain or the like having the usual corrugated exterior contour and provided intermediate its ends with a diametrally enlarged annular flange 16 suitably apertured for accommodating attachment-screws, as shown, for retaining the insulator e securely in place.

Snugly mounted in and extending longitudinally through the insulator e, is a suitable bronze or other electrically conductive stud 17 provided on its inner end-portion with an enlarged head-block C having flat parallel lateral or side faces c each provided with a single outwardly presented preferably silver contact-plug 18. On its inner end-face, the head-block C is cut-away or reduced in width in the provision of transversely extending L-shaped channels c' and stop-shoulders c''. On its opposite or outwardly presented end-face, the head-block C is milled cut in the provision of a relatively wide transversely extending channel, as at 19, and formed in the block C and opening into the base or bottom of the channel 19, is a pair of axially extending parallel pockets or recesses 19' for loosely seating suitable outwardly projecting compression springs 20.

Mounted shiftably on each of the head-blocks C, is a substantially U-shaped contact clip F having spaced parallel legs 21 and a bight 22 transversely reduced in width for fitting loosely within the channel 19. At and adjacent their free transverse margins, the legs 21 are laterally extended in the provision of oppositely projecting so-called ears 21' for disposition over the ends of the channels c', the ears 21' being provided with registering apertures 23 for accommodating fastening bolts 24 extending longitudinally through said channels c' and equipped on their projecting ends with spring washers 25 and tightening-nuts 26.

The clip F, on the inwardly presented opposed faces of its legs 21, is provided with projecting contact-plugs 27 for sliding engagement with the plugs 18, and upon the outwardly presented face of its bight 22 with a projecting silver contact plug 28 for sliding engagement with a blade contact plug 14.

Normally, it may here be stated, the compression springs 20 yieldingly shift the clip F outwardly with respect to the head-block C and cause the bolts 24 to engage at their shanks with the stop-shoulders c''. Then, under electrical engagement with the switch-blades D, the clips F are shifted inwardly against the tension of the springs 20, an excellent wiping or sliding engagement between the contact-plugs 14, 28, and 18, 27, being thereby obtained at the instant of circuit completion, all as best seen in Figure 5.

At its outer end, each stud 17 is threaded for receiving a tightening nut 29, conventional washers 30 being interposed upon the opposite end-faces of the insulator e for engagement respectively with the head-block C and the tightening nut 29, and the stud 17, on its threaded outer end, being provided with a fastening nut 31 for conventional engagement with any suitable type of buss-bar clamp or other conductor-engaging means not here shown.

In use and practice, the switch-casing A is suitably mounted in any desired location by means of the clamps 3 and the conductors, across which the switch is to operate, are suitably secured to the studs 17 by means of the fastening nuts 31. Thereupon, the handle 9 or gear 9', as the case may be, is swung or actuated through an arc of 90° from the position thereof shown in dot-dash lines to the position thereof shown in full lines in Figure 2, that is to say, from "off" to "on" position. The shaft B and associated switch-blades D are thereby axially oscillated through an arc of 90°, swinging the switch-blades D from so-called horizontal to so-called vertical position, bringing the silver contact buttons or plugs 14 thereof into tight compressive electrical engagement with the silver contact plugs 28 of the terminal clips F, shifting the latter yieldingly outwardly with respect to the head-blocks C of the terminals or contact-posts E, and sliding the silver plugs 18, 27, with respect to each other, excellent electrical contact being obtained, as previously mentioned.

By reason of the clampwise interlocking arrangement of their respective component or companion members d, the switch-blades D are extremely rigid under the circumferential forces exerted thereupon during circuit making engagement with the terminal clips F. Consequently, the circuit is completed quickly and sharply with a minimum of arcing and contact resistance. In fact, the additional physical stresses which are imposed upon the switch-blades D, as the same move into engagement with the terminal clips F, will be dissipated through the clamping bolts 15 and actually produce momentary increase of the clamping pressure of the respective hub-sections 10 of the switch-members $d$ upon the hubs $b'$, such increase in clamping pressure, in turn, increasing the engagement pressure between the component members $d$ of the switch-blades D and insuring excellent electrical contact throughout the switch-blade at the moment of circuit completion.

In the modified disconnecting switch of Figures 7-12, the switch-housing is in the form preferably of an open-faced rectilinear box-like shell or housing A' having opposite parallel end walls 1', opposite parallel side walls 2', and a rear or back wall 32. Along its outer margins, the housing A' is provided with an inwardly presented flange or trim 33 for flatwise seating a shell cover or closure-plate 34, the trim 33 having a plurality of suitably threaded openings or apertures for accommodating cover-securing members 35. Welded or otherwise suitably secured to and at the four corners of the housing A', are suitable brackets 36 for conventional securement of the switch to a wall or other supporting structure, as best seen in Figures 1 and 2.

The shell end walls 1' are centrally provided with registering apertures, as at o', fitting in which and suitably fixed to the shell walls 1', as best seen in Figure 9, are axially aligned bearing-members 38, 38', the latter being preferably integrally formed with a laterally projecting segmental flange 39 having a plurality of circumferentially spaced recesses or notches 40, all as best seen in Figure 9 and for purposes presently fully appearing.

Mounted for axial oscillation in, and extending longitudinally of the shell A' between, the bearing-members 38, 38', is a blade-carrying shaft B' built up or fabricated of a plurality of preferably glazed porcelain circumferentially corrugated individual cylindrical insulation sections $m$. Cemented or otherwise permanently fixed in each end face of each of the sections $m$, is a suitable internally threaded marginally flanged seat-block 41 for receiving a co-operatively threaded stud 42 of a connector-spindle section $n$ or bearing $n'$, as the case may be. Each spindle section $n$ includes a cylindrical body-portion or hub 43, projecting oppositely from which are the threaded studs 42, and which is provided in its opposite flat end-faces with relatively wide diametral slots, as at 44, for embracingly engaging a switch-blade D' preferably constructed from a suitably elongated flat strip of bronze or other suitably conductive metal and having the form of a so-called closed-end loop of rectilinear configuration, the side walls 45 of which are sized for snugly fitting intermediate their ends within the slots 44 and suitably apertured for accommodating the studs 42, all as best seen in Figures 11 and 12 and for purposes presently fully appearing.

In assembling the shaft B', a plurality of the porcelain or other insulation-sections $m$ are successively secured together in axial alignment by interposed spindle-connectors $n$, as best seen in Figure 9, it being, of course, evident that any number of blades D' may thus be incorporated into a single shaft, depending upon the number of different circuits which are to be simultaneously completed or broken by the particular switch. Preferably, I may add, in order to secure the entire assembly together as a single mechanically connected unit, each connector $n$ and companion flanged seat-blocks 41 are provided with a radially disposed common drill-hole, as at 46, for receiving an oversized pin 47, all as best seen in Figure 11. Bearings $n'$, each of which includes a cylindrical body-portion or hub 43' equipped merely with a single stud 42, are engaged at their respective studs 42 with, and as by means of like locking-pins 47 fixed to, the seat-blocks 41 at the opposite ends of the built-up or composite shaft B' and at their hubs 43' journaled for rotation in the bearings 38, 38', all as best seen in Figures 9 and 11.

One of the bearings $n'$ of the shaft B', as the bearing on the right-end of said shaft, reference being particularly made to Figure 9, is preferably integrally provided at its outer end with an extension or elongation, as at 48, preferably of square cross-section for non-rotatively receiving a conventional shaft-actuating handle or lever 49 having a suitably actuable detent 50 selectively engageable in the recesses or notches 40 of the bearing flange 39, all as best seen in Figures 7 and 9.

Suitably fixed in, and extending forwardly through the rear wall 32' of the housing A', is a plurality of contact posts or terminals E', which are arranged in pairs spaced equidistantly on diametrically opposite sides of the shaft B', each pair of the terminals E' being positioned for circuit-completing engagement with a particular switch-blade D', as best seen in Figure 7.

The contact or terminal posts E' are substantially similar structurally to the terminals E and each likewise includes a tubular insulator $e'$ of glazed porcelain or the like having the usual corrugated exterior contour, and each having a diametrally enlarged annular flange 16' suitably apertured for securement to the housing rear wall 32 by attachment-screws or the like 51.

Snugly mounted in, and extending longitudinally through, the insulator $e'$, is a suitable bronze or other electrically conductive stud 17' provided at its inner end with a flat head-block C' for engagement with an approximately L-shaped resilient contact terminal G constructed of a flat strip of suitable conducting material bent upon itself to include a relatively long leg-forming end-portion 52, an intermediate relatively short leg-portion 53 apertured for embracing disposition about the shank of a stud 17', an intermediate section 54 flatwise overlying, and spaced from the outer face of, the portion 53 for enclosing the head-block C', and an opposite end-portion 55 extending in spaced approximately parallel relation to the leg-portion 52, the portion 55 being, in turn, at its outer end bent arcuately in the provision of an abutment tongue 56 for re-enforcing engagement with the said leg-portion 52, all as best seen in Figures 8 and 10. Upon their outer face, each terminal leg 52 is provided with a preferably silver contact-plug 57 for circuit completing engagement with co-operable silver contact-plugs 58 provided in the opposite end walls 59 of the blade D', which walls 59 are preferably obliquely or angularly formed, as at 59', for facilitating electrical engagement between the plugs 57, 58.

In this connection, it should also be noted that the re-enforcing tongues 56 are preferably positioned directly beneath, as it may be said, the silver contact-plugs 57 for providing a maximum of compressive contact pressure when the circuit is completed, each stud 17' being suitably provided at its outer end with suitable tightening and fastening nuts 29', 31', substantially identical with and for the same purposes as the previously described nuts 29, 31, all as best seen in Figure 8.

In use and practice, the detent 50 is shifted out of engagement with the segmental flange 39 and the handle or lever 49 swung through an arc of 90°, the several blades D' being thereby shifted from so-called horizontal position into so-called vertical position and the several contact-plugs 58 into circuit-completing engagement with the contact-plugs 57, the lever 49 being reversely swung to initial position to break the circuit.

Figure 13:
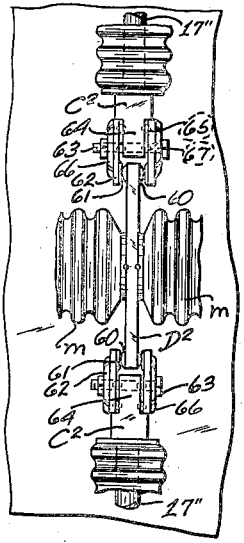
Figure 14:
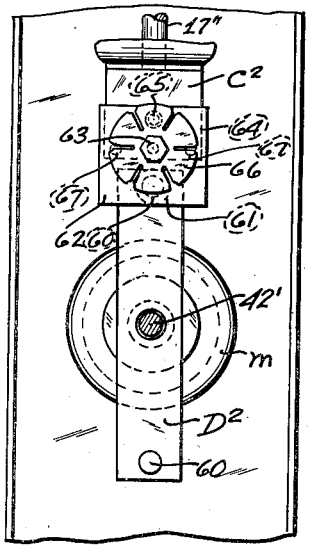
Figure 15:
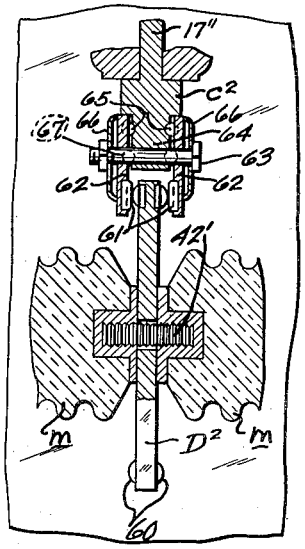

If desired, for the blade-carrying members 43 and the loop-type blades D' may be substituted single centrally apertured bronze or other conducting blades $D^2$, each respective blade $D^2$ being mounted between two insulation shaft-sections $m$, in turn, securely held axially together in shaft-formation by means of a threaded stud 42'. At its opposite outer ends, the blade $D^2$ is suitably provided with oppositely presented preferably silver contact-buttons 60 for engagement between contact-plugs 61 mounted in the opposed faces of terminal plates 62 rockably mounted upon a stud 63 extending through a tongue 64 projecting preferably integrally from the head-block $C^2$ of a terminal post stud 17'', the plates 62 being fulcrumed upon preferably silver balls 65 and resiliently or yieldingly urged toward each other by spring washers 66. Between the silver balls 65 and the contact plugs 61, the plates 62 are provided with auxiliary balls 67, which function as stops for limiting the inward swinging movement of the plates 62 under influence of the spring washers 66, all as best seen in Figures 13, 14, and 15.

Figure 16:
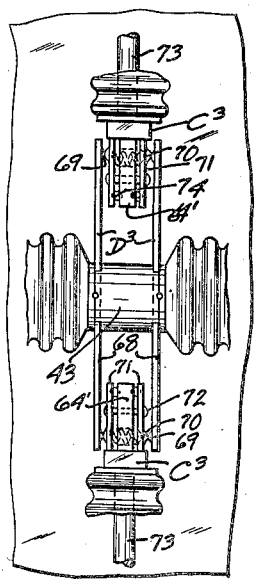
Figure 17:
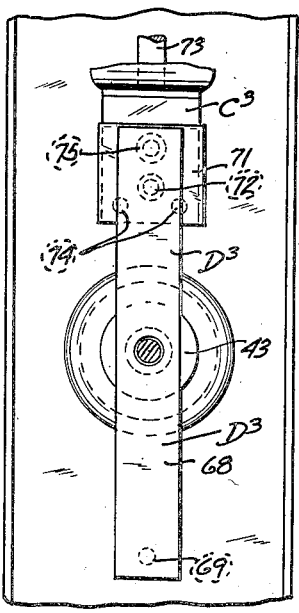
Figure 18:
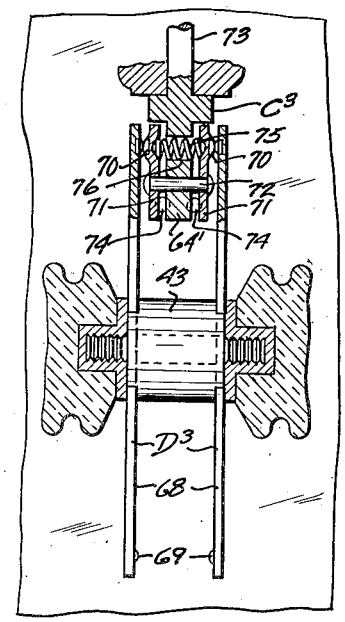

Similarly, a double-blade switch $D^3$ may be employed, in which a pair of spaced parallel conducting-strips 68 are substituted on a blade-carrying hub 43 for the loop-type blade D', the blade-strips 68 being provided at their outer end and upon their inwardly presented face with silver contact-plugs 69 for engagement with silver contact-plugs 70 mounted in the outwardly presented faces of terminal plates 71 rockably mounted upon a rivet-like stud 72 fixed in a tongue 64' projecting preferably integrally from a head-block $C^3$ of a terminal stud 73, the plates 71 being fulcrumed upon silver balls 74 and yieldingly urged outwardly into contactive position by means of a compression spring 75 disposed in a bore 76 extending transversely through the tongue 64', all as best seen in Figures 16, 17, and 18.

Figures 19–22 are illustrative of another modified type of switch embodying my invention. In this type, the blade-supporting shaft B'' is in the form of a preferably hollow "Bakelite" tube suitably journaled at its ends for rotary oscillation in brackets or bearings 5' mounted upon the wall 32' of the switch-housing, and suitably engaging the tube or shaft B'' for effecting axial oscillation thereof is a bell-crank 77. Suitably mounted on the wall 32', are spaced pairs of terminals E'' for circuit-making and breaking cooperation with blades $D^4$ preferably in the form of studs 78 projecting transversely through and suitably fixed to the shaft B'' and equipped at their respective ends with silver plugs 79 for engagement with co-operable plugs 80 in the terminals E''. It will be evident that the carrying capacity of the switch may be readily varied by increasing the number of blades $D^4$ for co-operable engagement with any set of terminals E'', as shown in Figure 22.

The switch fulfills in every respect the objects stated, and it should be understood that changes and modifications in the form, construction, arrangement, and combination of the several parts of the switch may be made and substituted for those herein shown and described without departing from the nature and principle of my invention.

Having thus described my invention, what I claim and desire to secure by Letters Patent is—

1. An electric switch including a shell, a contact-blade comprising oppositely disposed component members each including an intermediate annular section embracing said shaft, a flanged arm projecting from one end of said section, and a U-shaped arm projecting from the opposite end of said section and embracing the flanged arm of the component member, bolts securing the respective flanged and U-shaped arms together and said members upon the shaft, and contact-plugs carried by each of said U-shaped arms for electrical engagement with a co-operable terminal.

2. An electric switch including a terminal post comprising a stud, a head-block on the stud, a clip yieldingly shiftable on the head, contact-plugs on the head and clip for wiping contact, and a contact-plug on the clip for blade-engagement.

3. An electric switch including a terminal post comprising a stud, a head-block on the stud, a substantially U-shaped clip loosely fitting over, and yieldingly shiftable with respect to, the head, contact-plugs on the opposed side walls of the head and clip for wiping contact, and a contact-plug in the bight of the clip for blade-engagement.

4. An electric switch including a blade constructed of strap conducting material bent in the form of an open-sided loop of substantially rectangular cross-section and having oppositely presented transverse end sections forming juxtaposed contact faces for imposing compressive contact pressure along a line extending lengthwise of the blade.

5. In an electric switch, a shaft comprising joined insulation sections and an interposed connector, said connector including a cylindrical hub diametrically slotted on its opposite end face, and a blade including strap-portions fitting in said slots and interposed between said sections.

6. An electric switch including a terminal post comprising an insulation member, a stud fixed within said member, a head on an end of the stud, and a contact member constructed of a flat strip bent into approximately L-shape fixed at one of its legs upon said stud and a second L-shaped strip integrally connected at an end to the first strip for embracing said head and being bent over at its free end for impinging engagement against said first strip and thereby squeezing the head when contact pressure is applied.

7. An electric switch including a terminal post comprising an insulation member, a stud fixed within said member, a head on an end of the stud, a contact member constructed of a single strip of conducting material bent upon itself to include a relatively long leg-portion, an intermediate short leg-portion fitting upon said stud, a second intermediate portion spaced from said first intermediate portion and disposed over said head, an opposite end portion disposed in spaced parallel relation to said first leg-portion, and an arcuate tongue on said portion re-enforcingly engaging said first portion, and a contact-member fixed in a face of the first leg-portion for blade-engagement.

8. In an electric switch, a blade mounting shaft comprising a plurality of spaced insulators disposed in axial alignment and provided with opposed end faces, an internally threaded thimble fixed co-axially in each end face, a blade-carrying member disposed between each pair of opposed end faces and having oppositely extending threaded studs for retentive engagement in the thimbles, and means for holding the thimbles and blade-carrying members in non-rotative relation when the several elements are threaded together for complete shaft formation.

9. An electric switch including a frame, a hollow insulated shaft mounted in the frame for axial rotation, terminals mounted in the frame on opposite sides of and in equidistantly spaced relation to the shaft and having opposed contact faces disposed in planes substantially parallel to the longitudinal axis of the shaft, and a rod-like threaded blade member extending diametrally through the shaft and secured thereto by lock-nuts, said blade member being provided at its outer ends with endwise disposed oppositely presented contact faces for engagement with the corresponding contact faces of the terminals so that the contacting pressure will be imposed longitudinally through the blades.

10. In a disconnecting switch, a terminal element comprising a stud, a rectilinear head formed on the end of the stud and having a transverse end face provided with a relatively wide shallow recess extending thereacross in the provision of an open-ended channel, said head further being transversely cut away at its other end in the provision of a pair of shoulders, a low-resistance contact plug set into opposite side faces of the head, a U-shaped clip member shiftably mounted on the head and provided adjacent the upper free ends of its legs with laterally extending wings having registering apertures for receiving tightening bolts extending across the shoulders of the head for stop forming engagement therewith, the inner opposed faces of the clip legs being provided with low-resistance contact plugs for sliding engagement upon the outwardly presented faces respectively of the plugs set into the head and being compressively held thereagainst by the bolts, said clip member being sized along its bight for snug-fitting slidable engagement in the channel formed in the end face of the head, and spring means mounted in and projecting from the bottom wall of the channel for biasing the clip member outwardly from the channel and normally urging the bolts into stop-wise engagement with the shoulders of the head.

11. In a disconnecting switch having a rotary insulated shaft, a two-part blade member comprising two companion-shaped elements each including a radial contactor arm bent at its end for partially embracing the shaft and having a projecting end portion for inter-engagement with the other contactor element, and means extending through the inter-engaged portions of said elements for clamp-wise tightening said elements upon the shaft and to each other.

12. In a disconnecting switch, a pair of axially aligned rotary insulators connected by an intermediate hub member having axial studs extending in opposite directions and respectively threaded into the insulators, radially extending contactor blades mounted in and projecting outwardly from the hub member, and a radial pin mounted between the hub and each of the insulators for locking the hub and insulators against relative rotation.

WILLIAM H. LINDAE.